(12) United States Patent
De Graaf et al.

(10) Patent No.: US 10,253,438 B2
(45) Date of Patent: Apr. 9, 2019

(54) NET AND A METHOD OF MAKING THE SAME

(71) Applicant: MARITIEM CONSULTANTS B.V., Katwijk aan Zee (NL)

(72) Inventors: Erik Martin De Graaf, Hazerswoude-Dorp (NL); Maarten Cornelis De Graaf, Alphen aan den Rijn (NL)

(73) Assignee: Maritiem Consultants B.V., Katwijk aan Zee (NL)

( * ) Notice: Subject to any disclaimer, the term of this patent is extended or adjusted under 35 U.S.C. 154(b) by 387 days.

(21) Appl. No.: 14/913,496

(22) PCT Filed: Aug. 15, 2014

(86) PCT No.: PCT/NL2014/050564
§ 371 (c)(1),
(2) Date: Feb. 22, 2016

(87) PCT Pub. No.: WO2015/026229
PCT Pub. Date: Feb. 26, 2015

(65) Prior Publication Data
US 2016/0201238 A1    Jul. 14, 2016

(30) Foreign Application Priority Data

Aug. 22, 2013  (NL) .......................... 2011328

(51) Int. Cl.
*D04G 1/00* (2006.01)
*A01K 74/00* (2006.01)
(Continued)

(52) U.S. Cl.
CPC ............... *D04G 1/00* (2013.01); *A01K 74/00* (2013.01); *A01K 75/00* (2013.01); *A63B 9/00* (2013.01);
(Continued)

(58) Field of Classification Search
CPC .. D04G 1/00; A63B 63/00; A63B 9/00; A63B 2009/002; B66C 1/127;
(Continued)

(56) References Cited

U.S. PATENT DOCUMENTS 2,600,395 A * 6/1952 Domoj ................... D07B 1/185
124/90
2,804,676 A   9/1957 Smith
(Continued)

FOREIGN PATENT DOCUMENTS

WO     2010/106143 A1    9/2010

OTHER PUBLICATIONS

International Search Report, dated Nov. 14, 2014, from corresponding PCT application.

*Primary Examiner* — Shaun R Hurley
*Assistant Examiner* — Bao-Thieu L Nguyen
(74) *Attorney, Agent, or Firm* — N.V. Nederlandsch Octrooibureau; Catherine A. Shultz

(57) ABSTRACT

A net includes at least two ropes (2, 4), at least one mesh, wherein at least one corner of a mesh is formed by a knot (15) formed by two of the ropes (2, 4). The knot includes a first and a second opening (6, 8) in the first rope (2) through which the second rope (4) passes, and a first opening (10) in the second rope (4) through which the first rope (2) passes. A part of the first rope (2) is being positioned in the first opening (10) in the second rope (4) being in between the first and second opening (6, 8) of the first rope (2).

20 Claims, 5 Drawing Sheets

(51) Int. Cl.
  *A63B 9/00* (2006.01)
  *A63B 63/00* (2006.01)
  *A01K 75/00* (2006.01)
  *B66C 1/12* (2006.01)
(52) U.S. Cl.
  CPC .............. *A63B 63/00* (2013.01); *B66C 1/127* (2013.01); *A63B 2009/002* (2013.01)
(58) Field of Classification Search
  CPC ....... B29C 51/00; B29C 51/002; A01K 71/00; A01K 73/00; A01K 74/00; A01K 75/00; A01K 77/00
  USPC .............. 87/12, 53; 57/23; 428/58, 247, 255
  See application file for complete search history.

(56) References Cited

U.S. PATENT DOCUMENTS

| | | | |
|---|---|---|---|
| 3,252,676 A * | 5/1966 | Frieder | B64D 17/00 139/383 R |
| 4,000,344 A * | 12/1976 | Dilbey | B66C 1/127 156/148 |
| 5,622,094 A | 4/1997 | Rexroad | |
| 5,752,459 A * | 5/1998 | Rexroad | A63B 9/00 112/440 |
| 5,869,162 A * | 2/1999 | Traa | B65D 19/44 294/77 |
| 6,408,732 B1 * | 6/2002 | Rexroad | D04G 1/00 87/12 |
| 7,981,140 B2 * | 7/2011 | Burkhart | A61B 17/0401 606/232 |
| 8,808,602 B2 * | 8/2014 | Andrewartha | D04G 1/00 264/288.4 |
| 9,463,013 B2 * | 10/2016 | Pilgeram | A61B 17/0401 |
| 9,539,003 B2 * | 1/2017 | Stone | A61B 17/0469 |
| 2004/0094024 A1 | 5/2004 | Kim | |
| 2005/0137624 A1 * | 6/2005 | Fallman | A61B 17/0057 606/213 |
| 2012/0197271 A1 * | 8/2012 | Astorino | A61B 17/0057 606/148 |
| 2014/0046367 A1 * | 2/2014 | Stone | A61B 17/0469 606/228 |
| 2014/0203476 A1 * | 7/2014 | Andrewartha | D04G 1/00 264/288.4 |

* cited by examiner

NET AND A METHOD OF MAKING THE SAME

FIELD OF THE INVENTION

The invention generally relates to a net comprising at least two ropes, wherein the net comprises at least one mesh, wherein at least one corner of a mesh is formed by a knot formed by two of said ropes. The invention further relates to a method for manufacturing such a net.

BACKGROUND OF THE INVENTION

In general, nets are used for fishing or other marine purposes, as well as for recreational and industrial purposes. A weavers knot is commonly used in most net constructions, because it is efficient in knotting ropes together to form a net, both manually as well as automated.

A weaver's knot is disclosed in U.S. Pat. No. 2,804,676.

A disadvantage of nets with weaver's knots, is that the weaver's knot is prone to slipping, resulting in uneven mesh dimensions, and a distortion of the net structure resulting in a reduction of the performance of the net, possible damages and other unpredictable effects. This is especially the case with high performance fibers, as defined below.

Another disadvantage of the weaver's knot when used in fishing nets, is that such a knot, as a result of its size and shape can damage fish, resulting in lower survival likelihood for escaped fish and lower market value for retained fish.

The size and shape of the weaver's knot has the additional disadvantage that it is susceptible to abrasion in the process of being used. When a panel of netting is pulled over a hard surface, the relatively large knots will wear on the limited surface areas of these knots that make contact with the surface and result in a reduced longevity.

Due to the size and shape of the weaver's knot such nets have added drag (resistance) in hydrodynamic and aerodynamic flow. In fishing e.g. this leads to higher energy consumption and CO2 emissions to tow nets and also (especially in the case of fixed net structures) higher reaction forces.

Due to the size and shape of the weaver's knot such nets require substantial rope length to form the knot.

The weavers' knot is relatively big and has a low knot breaking strength which is also a disadvantage because less of the same material would be required to obtain a certain strength if an alternative knot would obtain higher knot breaking strengths.

The various disadvantages of the conventional weaver's knot are experienced not only in nets made from high performance fibers but also in nets made from other fibers including, but not limited to polyamide, polyester, polyethylene, polypropylene, natural fibers, combinations of such fibers, and related products, further referred to as "conventional fibers" in this document.

SUMMARY OF THE INVENTION

It is an object of this invention to provide a net and a method of manufacturing a net which overcomes at least one of the above mentioned disadvantages.

According to an embodiment a net is provided, the net comprising at least two ropes, wherein the net comprises at least one mesh, wherein at least one corner of a mesh is formed by a knot formed by two of said ropes, wherein the knot comprises a first and a second opening in the first rope through which the second rope passes, and a first opening in the second rope through which the first rope passes, a part of the first rope being positioned in the first opening in the second rope being in between the first and second opening of the first rope.

In other words, the first opening in the second rope is positioned in the parts of the second rope being positioned in between the first and second openings of the first rope.

It is noted that the term net as used refers to a structure of interconnected ropes, the ropes forming at least one mesh. The net may comprise a frame to which the ropes are attached. The term mesh refers to an opening in the net. A mesh may be bounded by ropes, but may also be at least partially bounded by part of the frame.

The knot thus comprises the second rope passing through an opening in the first rope, the first rope passing through an opening in the second rope and the second rope passing through a further opening in the first rope, the opening in the second rope being located in between the openings of the first rope.

The rope may be formed of a plurality of strands. The openings may be created by pulling apart the strands forming the rope. The ropes may be of a twisted, braided, or woven construction, formed by at least 2 strands, for instance having 2, 3, 4, 6, 8, 12, 16, 24 or any other number of strands. An opening may be formed by pulling the strands apart in two groups, preferably of similar size. For instance, in case of a 12-strand braided rope, an opening can be created by pulling 6 strands to one side and 6 strands to the other side.

In addition, the rope may comprise a core. The core can be made of the same material of the said rope, or of any other suitable material, such as metal, preferably steel, but is not restricted to said material.

A rope may have a circular cross section or a non-circular cross section. The rope may be of a twisted, braided, or woven construction.

For the purpose of this document, a woven band is to fall under the definition of rope as well.

When the net only comprises a knot with one opening in the first rope and one opening in the second rope, the knot will be an unstable knot. Such a knot is frequently used in the production of various net applications, including industrial nets such as e.g. cargo nets and safety nets. Pulling said ropes in one of the two directions may cause slipping, creating an unstable knot. In other words, when pulling forces are applied to the net comprising such a knot, said knot can extend or slip, changing the dimensions of the meshes of the net.

According to the invention, a net with a non-slipping knot is provided, which has an optimal resistance when pulling forces are applied to the net from any direction as to keep the dimensions and location of the meshes constant, so, the meshes will always retain their shape throughout the net. Moreover, by having the first opening in the second rope positioned in between the first and second opening in the first rope a strong knot is provided which cannot be untied or get undone easily.

The knot effectively prevents slippage and deformation of the knot and overturn of the knot is prevented. At the same time, this enables the knots to have relatively small dimensions, while improving the knot-breaking strength. The drag of the net will be reduced by the shape and smaller size of the knot. This results in less fuel consumption and less CO2 emissions.

The life of the net is improved and less affected by wear. So, the net provided, results in an improved net life when compared to nets produced with for instance a weavers' knot.

In an embodiment the first and second openings in the first rope are directed in a direction between 45° and 135° with respect to a longitudinal body axis of the first rope. The openings may be parallel, although this is not necessarily the case.

According to an embodiment the first and second openings in the first rope are directed in a transversal direction with respect to a longitudinal body axis of the first rope.

The term longitudinal body axis is used to refer to the body axis forming the rotational symmetry axis of the rope, running from one end to the other end of the rope. It will be understood that the longitudinal body axis is not necessary a straight axis, but follows the bends of the rope.

According to a further embodiment the first and second openings in the first rope are parallel with respect to each other.

According to a further embodiment the direction in which the second rope passes the first and second openings in the first rope is substantially the same. This results in a relatively compact knot.

According to a further embodiment the knot comprises a second opening in the second rope through which the first rope passes, the second rope passing through the second opening in the first rope, a part of the second rope being positioned in the second opening of the first rope being in between the first and second opening in the second rope.

Additionally, this offers even further strength and stability.

According to an embodiment the first opening and second openings in the second rope are directed in a direction between 45° and 135° with respect to a longitudinal body axis of the second rope.

According to an embodiment the first and second openings in the second rope are directed in a transversal direction with respect to a longitudinal body axis of the second rope.

According to an embodiment the direction in which the first rope passes the first and second openings in the second rope is substantially the same. Advantageously, this provides still a very compact non-slipping knot, creating a clean mesh structure. In addition, a low maintenance net is provided, due to the fact that the knot still remains small and thus minimizing the wear during contact on hard surfaces. In other words, abrasion of the net is minimized.

According to an embodiment a distance between the first and second openings in the first rope is preferably between 0.3-5.0 times the diameter of the second rope, and most preferably between 0.3-3.0 times the diameter of the second rope. This ensures a compact knot.

The distance is not necessarily equal to the diameter of the second rope. The distance may be smaller, for instance in the range of 0.3-1.0 times the diameter of the second rope, 0.7-1.0 times the diameter of the second rope, or in the range of 0.3-0.9 times the diameter of the second rope, or most preferably between 0.7-0.8 times the diameter of the second rope. Alternatively, the distance may be larger, for instance in the range of 1.0-5.0 times the diameter of the second rope, 1.1-5.0 times the diameter of the second rope, and most preferably between 1.0-3.0 times the diameter of the second rope, or 1.1-3.0 times the diameter of the second rope. The distance may also be in the range 0.7-1.3 of the diameter of the second rope.

According to an embodiment a distance between the first and second openings in the second rope is preferably between 0.3-5.0 times the diameter of the first rope, and most preferably between 0.3-3.0 times the diameter of the first rope. This ensures a compact knot.

The distance is not necessarily equal to the diameter of the first rope. The distance may be smaller, for instance in the range of 0.3-1.0 times the diameter of the first rope, 0.7-1.0 times the diameter of the first rope, or in the range of 0.3-0.9 times the diameter of the first rope, or most preferably between 0.7-0.8 times the diameter of the first rope. Alternatively, the distance may be larger, for instance in the range of 1.0-5.0 times the diameter of the first rope, 1.1-5.0 times the diameter of the first rope, and most preferably between 1.0-3.0 times the diameter of the first rope, or 1.1-3.0 times the diameter of the first rope. The distance may also be in the range 0.7-1.3 of the diameter of the first rope.

The last two embodiments result in a relatively small distance in between the openings, as to leave minimum space for the ropes of the knot to move with reference to each other, and the knot becoming loose. Thereby, a tight and compact knot is created.

According to an embodiment, the smallest cross sectional dimensions of the openings in the ropes is substantially equal to the diameter of the other ropes passing through the opening. Preferably, the opening allows the other rope to pass through in a tight fit, to create a stable and compact knot.

According to an embodiment both ropes forming a knot may be passed through each other additional times, further adding stability and strength.

According to an embodiment the knot consists of an odd number of openings, the number being 3 or greater.

According to an embodiment the first and second rope are routed in opposing diagonal directions through the net. This is commonly referred to in net making practices as 'along the bar' or 'AB direction'. In such net configurations, a rope typically forms a plurality of knots with a plurality of other ropes. The same ropes may only form one knot together, although in certain net configurations, the same ropes may meet each other to form a knot more than once. This only applies for nets having knots with an odd number of openings.

According to an embodiment the knot consists of an even number of openings, the number being 4 or greater.

According to an embodiment the first and second rope are routed in a zigzag pattern through the net. This is commonly referred to in net making practices as 'along the side-knot', or 'N direction'. In such net configurations, a rope typically forms a plurality of adjacent knots with two other ropes in turns. The same ropes meet each other to jointly form a knot multiple times (once every other knot). This only applies for nets having knots with an even number of openings.

Such a net is used in situations where it is deemed advantageous not to have the ropes progress from knot to knot in a diagonal direction, both in opposite directions, but in parallel longitudinal direction.

So, the net comprising a knot as described above can be used for creating nets having different net configurations.

According to an embodiment the ropes are made of or at least comprise high performance fibers. High performance fibers provide strong and light-weighted ropes.

The ropes may comprise a mixture of high performance fibers and conventional fibers. The ropes may also be made of conventional fibers, from steel wire rope, or a combination of steel wire rope and high performance and/or conventional fibers, as the advantages mentioned also apply to ropes made of any material. Optionally, the ropes may comprise a core.

High performance fibers with a high modulus and strength, generally also referred to as high-performance polyethylene (HPPE), polyvinyl alcohol, liquid crystal polymers (LCP), aramide, polybisoxazoline (PBO) and similar products, including but not limited to Dyneema, Spectra, Vectran, Zylon, Technora, Twaron, Nomex and Kevlar, are referred to in this document as "high performance fibers".

According to an embodiment, the net is a marine net, preferably a fishing net, a recreational net, such as for instance a sports net, a playground net, an industrial net, such as for instance a cargo net or a safety net, or any other type of net.

Furthermore, the invention relates to a method for manufacturing a net, the net comprising a at least one mesh, the method comprises the following steps:

providing at least two ropes;

creating at least one mesh, wherein at least one corner of a mesh is formed by a knot formed by two of said rope, the method comprising forming the knot by the following:

creating a first opening in the first rope and passing an end part of the second rope through the first opening, creating a first opening in the second rope and passing an end part of the first rope through the first opening in the second rope, creating a second opening in the first rope and passing the end part of the second rope through the second opening.

The openings are positioned such that a part of the first rope being positioned in the first opening in the second rope is in between the first and second opening of the first rope. the first and second openings in the first rope are relatively close to each other, the second opening being in between the first opening and a free end of the first rope.

It should be noted that when referring to the free end, it is meant an end part of the rope which is not tied to any other previously formed knot or frame and is thus available for forming a knot.

As a result, the weight of the net is lower, because there is less material used in each of the knots produced, than in knots produced using a conventional method, such as the weavers knot.

The method may further comprise pulling either one or both ropes to tighten the knot. This may be done after forming the last opening and passing a rope through the last opening. However, pulling to tighten the knot may also be done in between the different steps of the method, in particular in between all steps after creating a first opening in the second rope and passing an end part of the first rope through the first opening in the second rope.

According to an embodiment the method further comprises:

creating a second opening in the second rope and passing the end part of the first rope through the second opening of the second rope.

As a result, a part of the second rope being positioned in the second opening of the first rope is in between the first and second opening in the second rope. The second opening in the second rope is relatively close to the first opening in the second rope and is positioned in between the first opening in the second rope and a free end of the second rope.

According to an embodiment the method further comprises:

creating additional openings in either ropes and passing the ropes through each other in continuing alternating turns.

In summary, the above embodiments provide a method which offers a net, with particularly simple, firm and small knots which enhance the stability, the overall strength, the weight and the susceptibility to abrasion of the net. And in case of a marine net, in particular a fishing net, a net with less drag and improved fishing properties, such as less damaged fish.

BRIEF DESCRIPTION OF THE DRAWINGS

Aspects, features and details of the present invention will be readily understood by reference to the following detailed description of embodiments, taken in conjunction with the figures and the appended claims. In the appended figures:

The figures are only meant for illustrative purposes, and do not serve as a restriction of the scope or the protection as laid down by the claims. The figures do not necessarily show the correct distance between the openings in the ropes.

DETAILED DESCRIPTION OF THE EMBODIMENTS

FIGS. 1-6 show different steps for forming a knot according to an embodiment.

Figure 1:
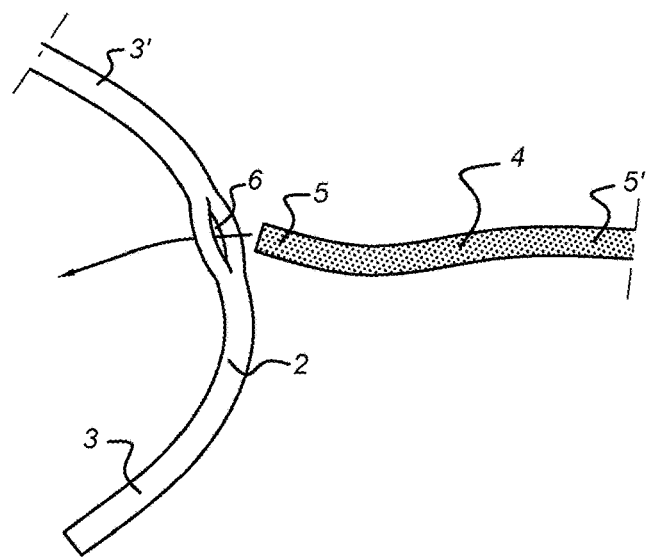
FIGS. 1-6 show different steps of forming a knot according to an embodiment.

FIG. 1 shows a first rope 2 and a second rope 4. The first and second ropes 2, 4 are used to form a net. The net 1 may be a marine net, in particular a fishing net, a recreational net (sports net, playground net), an industrial net (cargo net, safety net) or any other type of net.

The net 1 may of course comprise more ropes, although these are not shown in FIG. 1. The net 1 may also comprise a frame to which the edges of the net 1 are attached.

The first rope 2 has a free end 3 and the second rope has a free end 5. The other ends (referred to as 3', 5' in the figures) are shown schematically, as it will be understood that these parts of said ropes may already be fixed to other previously formed knots or may be attached to a frame.

The first and second rope 2, 4, each may be of a twisted, braided, or woven construction, formed by at least 2 strands, for instance having 2, 3, 4, 6, 8, 12, 16, 24 or any other number of strands, with or without additional core (not illustrated). The first and second ropes 2, 4 are preferably made of or at least comprise high performance fibers.

By pulling aside a number of strands in a transversal direction with respect to a longitudinal body axis of the ropes, an opening can be provided in the rope. When the number of strands forming the rope (including the core, when applicable) is even, an equal number of strands may be pulled to one side as to the other side. If the number of strands is odd, the number of strands pulled to one side preferably deviates just one from the number of strands pulled to the other side.

Additionally, an eyelet or grommet can be provided (not illustrated), being said eyelet or grommet made of any suitable material, and which may be installed into the openings in order to maintain and reinforce said openings. Preferably, the eyelet or grommet will be made of a material selected but not limited to a plastic, rubber or metal. This also applies to the further openings described further below.

FIG. 1 shows a first opening 6 in the first rope 2. The free end 5 of the second rope 4 is about to be pulled through the first opening 6 provided in the first rope 2, as indicated by the arrow shown in FIG. 1.

Figure 2:
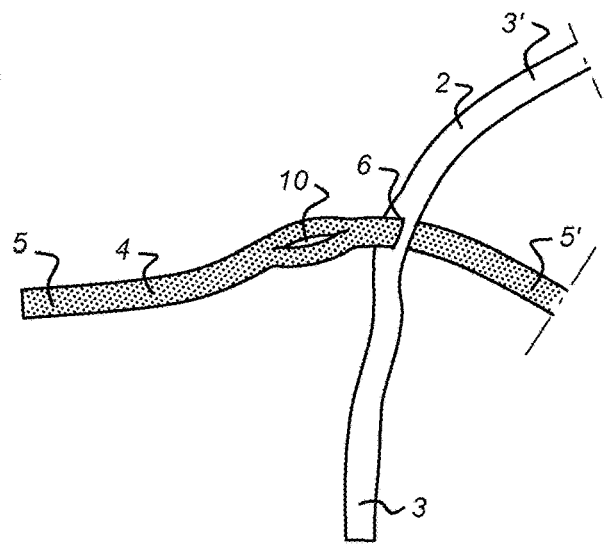
Figure 3:
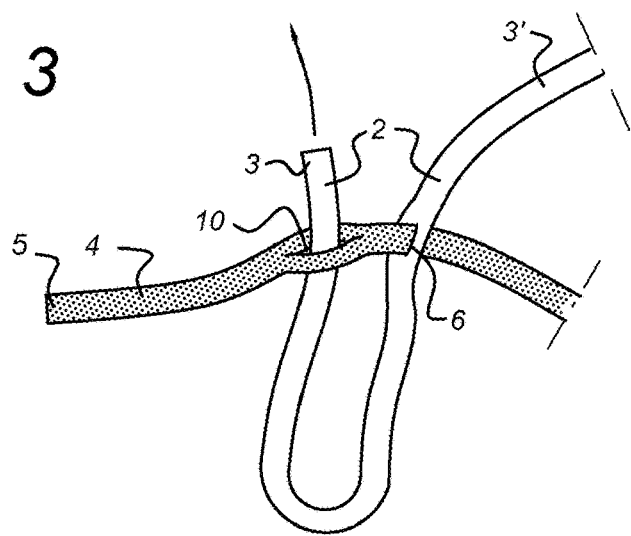

The result of this action is shown in FIG. 2. The first opening 6 in the first rope 2 is substantially transversal with respect to the longitudinal body axis of the first rope 2.

However, other angles may be applied, including angles in the range of 45°-135° with respect to the longitudinal body axis of the first rope 2.

As further shown in FIG. 2, the free end part 5 of the second rope 4 is inserted into and pulled through the first opening 6 in the first rope 2. Also, a first opening 10 in the second rope 4 is created.

Figure 4:
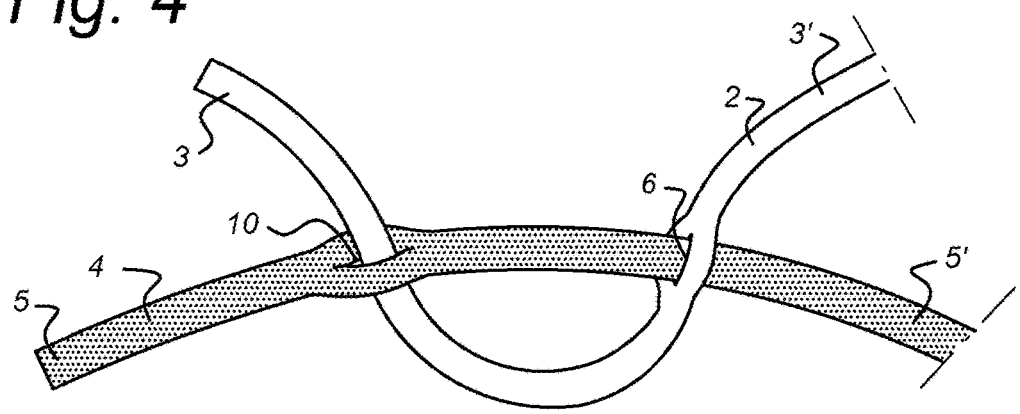

Next, the free end 3 of the first rope 2 is inserted into and pulled through the first opening 10 of the second rope 4. This is shown and indicated by the arrow in FIG. 3. The result is shown in FIG. 4. The first openings 6, 10 in the first and second rope 2, 4 respectively can be positioned against each other by pulling, e.g. by pulling the free end 3 of the first rope 2.

Figure 5:
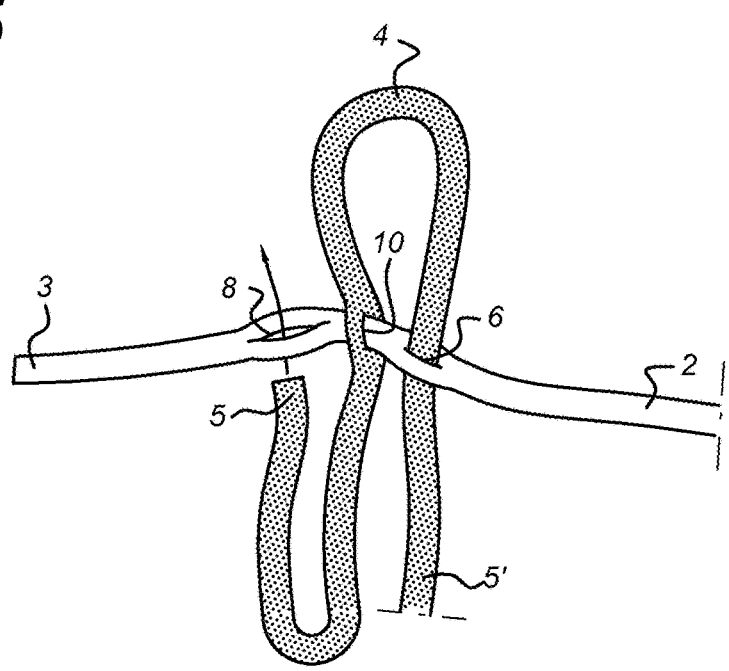

FIG. 5 further shows that a second opening 8 is created in the first rope 2. The second opening 8 is positioned in between the first opening 6 in the first rope 2 and the free end 3 of the first rope 2, preferably in the vicinity of the first opening 6. The distance between the first opening 6 and the second opening 8 in the first rope 2 is preferably in the range of 0.3-5 times the diameter of the second rope 4, as already indicated above. The distance may be chosen close to the diameter of the second rope 4 to provide a compact knot, for instance in the range 0.7-1.3 times the diameter of the second rope 4.

The arrow in FIG. 5 indicates the direction in which the free end 5 of the second rope 4 is to be pulled through the second opening 8 of the first rope 2.

Figure 6:
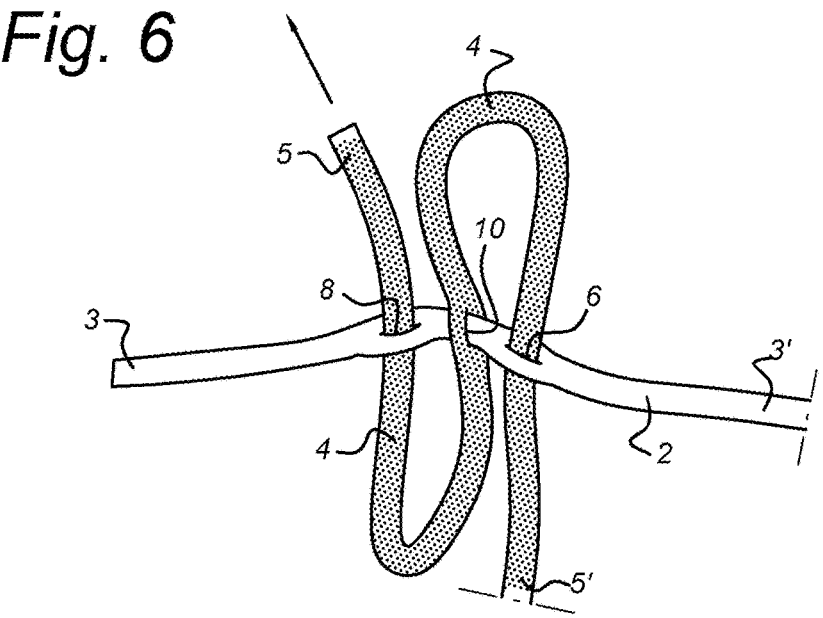

It is noted that the direction in which the second rope 4 passes the first and second openings 6, 8 in the first rope 2 is substantially the same, i.e. the direction in which the free end 5 of the second rope 4 is pulled through the first and second openings 6, 8 in the first rope are parallel and in the same direction. The result of this is shown in FIG. 6.

It is noted that FIGS. 3-6 show loops instead of a tight knot. This is done for reasons of clarity, but it will be understood that by pulling the ropes the knot can be tightened and that this will usually be done when forming a net. This can for instance be done in the situation shown in FIG. 4, before creating the second opening 8 in the first rope 2, and after the situation in FIG. 6, when the free end 5 of the second rope 4 is pulled through the second opening 8 in the first rope 2. The result of pulling and tightening the knot can best be seen in FIG. 7.

Figure 7:
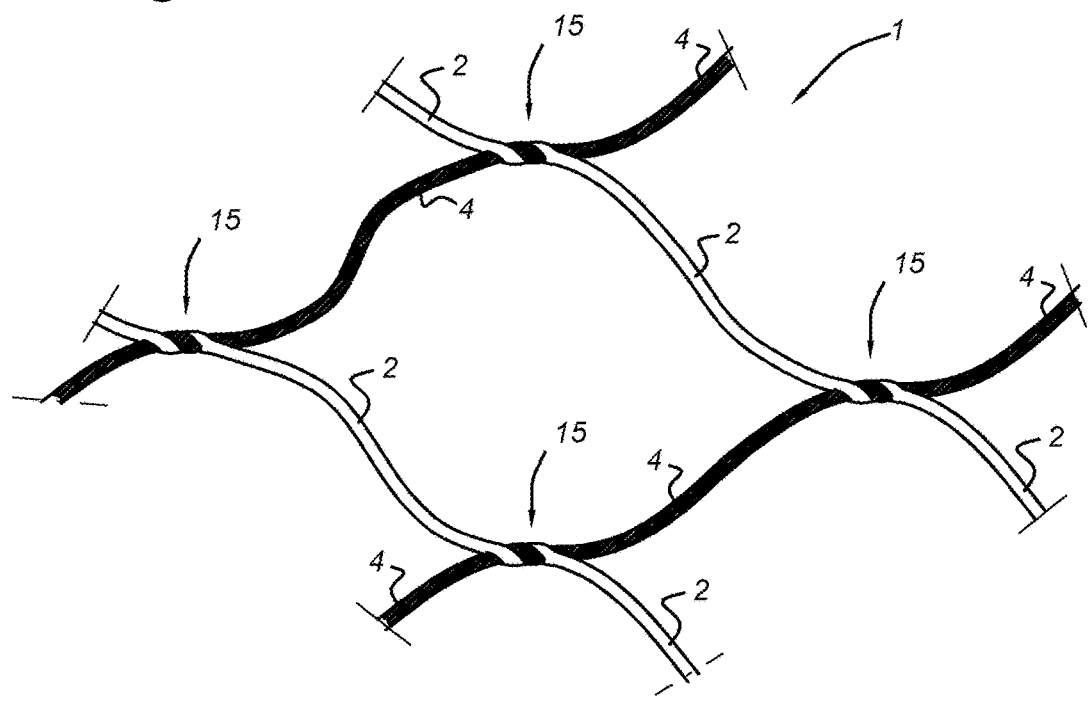
FIG. 7 shows a partial view of a net according to an embodiment, FIGS. 8-9 shown further steps according to a further embodiment.

FIG. 7 shows a larger part of the net 1, showing a plurality of meshes, the corners of the meshed being formed by knots 15 according to the explanation provided above with reference to FIGS. 1-6.

The steps shown in FIGS. 1-6 thus result in a knot 15 comprising a first and a second opening 6, 8 in the first rope 2 through which the second rope 4 passes, and a first opening 10 in the second rope 4 through which the first rope 2 passes, a part of the first rope 2 being positioned in the first opening 6 in the second rope 4 being in between the first and second opening 6, 8 of the first rope 2.

The knot formed in accordance with FIGS. 1-6 consists of an odd number of openings (two in the first rope 2 and one in the second rope 4). This preferably is used in a net structure as shown in FIG. 7, where the first and second ropes 2, 4 are routed in opposing diagonal directions through the net. This is commonly referred to in net making practices as 'along the bar' or 'AB direction'. In such net configurations, the same ropes meet each other to jointly form a knot only once. It will be understood that a similar net structure can be obtained by a knot comprising an odd number of openings greater than three.

As illustrated in FIG. 7, the openings 6, 8, 10 are arranged at adjacent positions as to create compact knots 15.

According to a further embodiment, knots 15' may be created comprising four openings. Additionally, a greater even number of openings can be created, for instance six, eight or even more openings.

Figure 8:
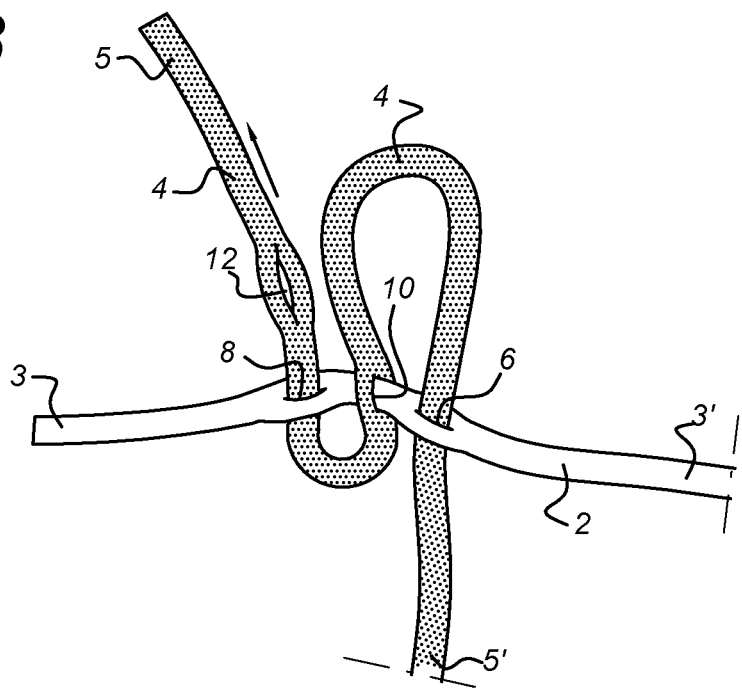
Figure 9:
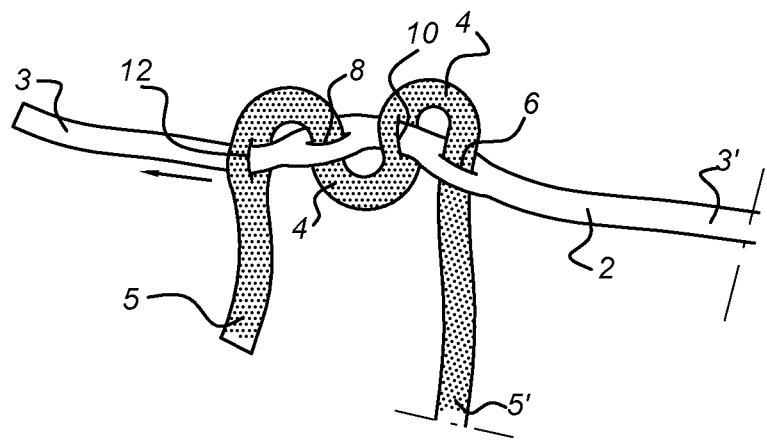

FIGS. 8 and 9 show how to make a knot with a fourth opening, taking the situation of FIG. 6 as starting point. After the free end 5 of the second rope 4 is pulled through the second opening 8 of the first rope and the knot is tightened, a second opening 12 is created in the second rope 4. This second opening 12 is formed in between the first opening 10 in the second rope 4 and the free end 5 of the second rope 4, but preferably in the vicinity of the first opening 10 in the second rope 4. The distance between the first opening 8 and the second opening 10 in the second rope 4 is preferably in the range of 0.3-5 times the diameter of the first rope 2, as already indicated above. The distance may be chosen close to the diameter of the first rope 2 to provide a compact knot, for instance in the range 0.7-1.3 times the diameter of the first rope 2.

The distance between the first and the second openings 10, 12 in the second rope 4 as shown in FIGS. 8 and 9 is substantially equal to the distance between the first and second openings 6, 8 in the first rope 2, in particular when the first and second rope 2, 4 have the same diameter.

Figure 10:
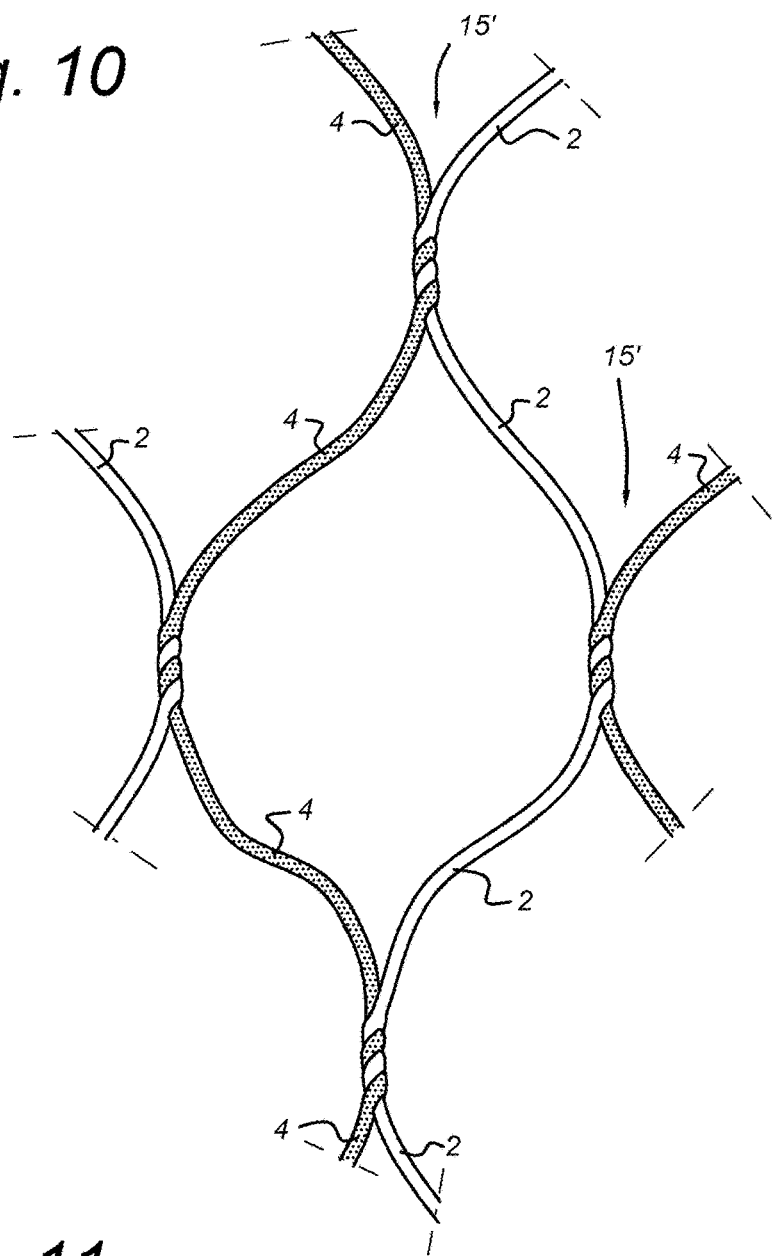
FIG. 10 shows a partial view of a net according to a further embodiment.

Next, the free end 3 of the first rope 2 is pulled through the second opening 12 of the second rope 4. The result is shown in FIG. 9. Again, FIGS. 8 and 9 show the knot in a loose configuration, but this is done for reasons of clarity. In practice, the ropes will be pulled to tighten the knot 15', which is best shown in FIG. 10.

The knot formed in accordance with FIGS. 8, 9 consists of an even number of openings (two in the first rope 2 and two in the second rope 4). This preferably is used in a net structure as shown in FIG. 10, where the first and second ropes 2, 4 are routed in a zigzag pattern through the net. This is commonly referred to in net making practices as 'along the side-knot', or 'N direction'. In such net configurations, the same ropes meet each other to jointly form a knot multiple times. It will be understood that a similar net structure can be obtained by a knot comprising an even number of openings greater than four.

Figure 11:
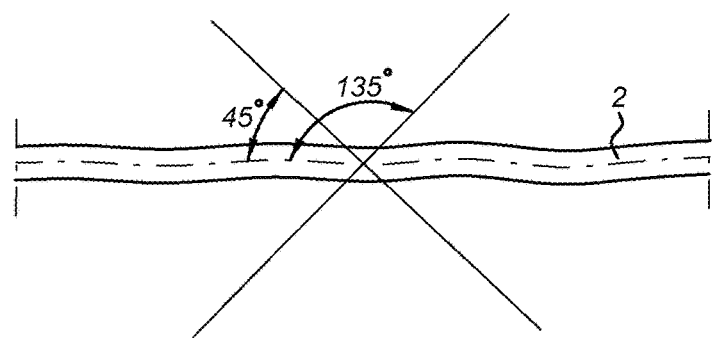
FIG. 11 shows a longitudinal body of a rope according to an embodiment.

FIG. 11 shows the longitudinal body of the first rope 2 wherein the angles at which the openings may be at with respect to the longitudinal body axis of the rope 2 are represented.

The orientation of the openings are all shown as being transversal with respect to a longitudinal body axis of the ropes. However, the orientation of the openings may be at an angle with respect to the longitudinal body axis in the range of 45°-135°. Openings in the same rope comprised by the same knot are preferably parallel with respect to each other.

In the light of the above, variants will be immediately apparent to those skilled in the art that are obvious in the light of the above description and fall within the scope of the appended claims.

REFERENCE NUMERALS

2. First rope
3. free end of the first rope

3'. Second end of the first rope
4. Second rope
5. Free end part of the second rope
5'. Second end part of the second rope
6. First opening in the first rope
8. Second opening in the first rope
10. First opening in the second rope
12. Second opening in the second rope
15. Knot
15'. Knot

The invention claimed is:

1. A net comprising at least a first rope and a second rope being distinct from the first rope, wherein the net comprises a plurality of meshes, wherein at least one corner of a mesh is formed by a knot formed by said first and second ropes, wherein the knot comprises a first opening and a second opening in the first rope, the second rope passing through both the first opening and the second opening in the first rope, and wherein the knot further comprises a first opening in the second rope through which the first rope passes, wherein a part of the first rope is positioned in the first opening in the second rope, and wherein said part of the first rope and first opening in the second rope are located in between the first and second openings of the first rope and respective parts of the second rope passing therethrough.

2. The net according to claim 1, wherein the first and second openings in the first rope are directed in a direction between 45° and 135° with respect to a longitudinal body axis of the first rope when said first rope is held to extend along a straight line.

3. The net according to claim 1, wherein the first and second openings in the first rope are directed in a transversal direction with respect to a longitudinal body axis of the first rope when said first rope is held to extend along a straight line.

4. The net according to claim 1, wherein the first and second openings in the first rope are parallel with respect to each other when said first rope is held to extend along a straight line.

5. The net according to claim 1, wherein the direction in which the second rope passes the first and second openings in the first rope is substantially the same.

6. The net according to claim 1, wherein the knot comprises a second opening in the second rope through which the first rope passes, the second rope passing through the second opening in the first rope, a part of the second rope being positioned in the second opening of the first rope being in between the first and second opening in the second rope.

7. The net according to claim 6, wherein the first opening and second openings in the second rope are directed in a direction between 45° and 135° with respect to a longitudinal body axis of the second rope when said second rope is held to extend along a straight line.

8. The net according to claim 6, wherein the first and second openings in the second rope are directed in a transversal direction with respect to a longitudinal body axis of the second rope when said second rope is held to extend along a straight line.

9. The net according to claim 6, wherein the direction in which the first rope passes the first and second openings in the second rope is substantially the same.

10. The net according to claim 1, wherein a distance between the first and second openings in the first rope is between 0.3-5 times the diameter of the second rope.

11. The net according to claim 6, wherein a distance between the first and second openings in the second rope is between 0.3-5 times the diameter of the first rope.

12. The net according to claim 1, wherein the knot consists alternating of an odd number of openings, the number being 3 or greater.

13. The net according to claim 12, wherein the first and second rope are routed in opposing diagonal directions through the net.

14. The net according to claim 1, wherein the knot consists of an even number of openings, the number being 4 or greater.

15. The net according to claim 14, wherein the first and second rope are routed in a zigzag pattern through the net.

16. The net according to claim 1, wherein the ropes are made of or at least comprise one or more selected from the group of: High Performance Poly Ethylene (HP-PE) fibers, Polyvinyl Alcohol (PVOH) fibers, liquid crystal polymer (LCP) fibers, aramid fibers, and polybisoxazoline (PBO) fibers.

17. The net according to claim 1, wherein the net is one of a marine net, a recreational net, and an industrial net.

18. A method for manufacturing a net, the net comprising a at least one mesh, the method comprises:
providing a first rope and a second rope being distinct from the first rope;
creating a plurality of meshes, wherein at least one corner of a mesh is formed by a knot formed by said first and second ropes, the method comprising forming the knot by the following:
creating a first opening in the first rope and passing an end part of the second rope through the first opening,
creating a first opening in the second rope and passing an end part of the first rope through the first opening in the second rope, thereby causing a part of the first rope to be positioned inside the first opening in the second rope,
creating a second opening in the first rope and passing the end part of the second rope through the second opening, thereby causing said part of the first rope to be located in between the first and second openings of the first rope and respective parts of the second rope passing therethrough.

19. The method according to claim 18, wherein the method further comprises:
creating a second opening in the second rope and passing the end part of the first rope through the second opening of the second rope.

20. The method according to claim 18, wherein the method further comprises:
creating additional openings in either ropes and passing the ropes through each other in continuing alternating turns.

* * * * *